US007043469B2

(12) United States Patent
Goralwalla et al.

(10) Patent No.: US 7,043,469 B2
(45) Date of Patent: May 9, 2006

(54) METHOD AND SYSTEM FOR SLOW MATERIALIZATION OF SCROLLABLE CURSOR RESULT SETS

(75) Inventors: Iqbal A. Goralwalla, Pickering (CA); William T. O'Connell, Etobicoke (CA); David C. Sharpe, Mountain View (CA)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 10/183,749

(22) Filed: Jun. 26, 2002

(65) Prior Publication Data
US 2003/0078917 A1    Apr. 24, 2003

(30) Foreign Application Priority Data
Oct. 18, 2001    (CA) ................................ 2359277

(51) Int. Cl.
*G06F 17/30* (2006.01)
(52) U.S. Cl. .............................. 707/2; 707/3
(58) Field of Classification Search ................ 707/1–3
See application file for complete search history.

(56) References Cited

U.S. PATENT DOCUMENTS

| 4,805,099 A | * | 2/1989 | Huber ........................ 707/102 |
| 5,542,078 A | | 7/1996 | Martel et al. ................ 395/600 |
| 5,584,026 A | * | 12/1996 | Knudsen et al. ................ 707/1 |
| 5,724,569 A | | 3/1998 | Andres ........................ 395/602 |
| 5,768,577 A | | 6/1998 | Kleewein et al. ........... 395/610 |
| 5,787,436 A | * | 7/1998 | Blackman et al. ...... 707/103 R |
| 5,835,904 A | | 11/1998 | Vicik et al. .................... 707/1 |
| 6,009,425 A | | 12/1999 | Mohan .......................... 707/8 |
| 6,038,562 A | | 3/2000 | Anjur et al. .................. 707/10 |
| 6,038,569 A | | 3/2000 | Beavin et al. ............... 707/203 |
| 6,081,808 A | | 6/2000 | Blackman et al. .......... 707/103 |
| 2002/0143751 A1 | * | 10/2002 | Chow et al. .................... 707/3 |

FOREIGN PATENT DOCUMENTS

| JP | 1998000353650 | 6/2000 |
| JP | 1999000012794 | 8/2000 |

OTHER PUBLICATIONS

IEEE Transactions on Knowledge and Data Engineering, vol. 8, No. 2, Apr. 1996, pp. 260–272, "Optimization of Materialization Strategies for Derived Data Elements," D. Botzer and O. Etzion.

(Continued)

*Primary Examiner*—Jack M. Choules
(74) *Attorney, Agent, or Firm*—Sawyer Law Group LLP

(57) ABSTRACT

The present invention provides a system and a method for materializing records in a result set in response to a query. The computer system comprises a server and a client. The server has a database and a database management system for providing access to the database. The client is operatively coupled to the database management system. The client is adapted to provide a query to the database management system and the database management system is adapted to materialize a number of records in a result set in response to the query. The number of materialized records is selected to reduce inefficient materialization of records from the database in response to the query.

6 Claims, 3 Drawing Sheets

OTHER PUBLICATIONS

1996 IEEE, pp. 310-317, "Using Object-Oriented Principles to Optimize Update Propagation to Materialized Views," Kuno and Rundensteiner, Dept. of Elec. Engin. and Computer Science, Softwre System Research Lab., University of Michigan, Ann Arbor, MI 48109-2122.

Sigmod Record, vol. 25, No. 2, Jun. 1996, pp. 447-458, "Materialized View Maintenance and Integrity Constraint Checking: Trading Space for Time," Ross, Srivastava and Sudarshan.

IBM Technical Disclosure Bulletin, vol. 22, No. 4, Sep. 1979, pp. 1657-1660, "Access Path Selection in a Relational Database Management System.".

* cited by examiner

METHOD AND SYSTEM FOR SLOW MATERIALIZATION OF SCROLLABLE CURSOR RESULT SETS

CROSS-REFERENCE TO RELATED APPLICATION

This application claims benefit under 35 USC 119 of Canadian Application Serial No. 2,359,277 filed Oct. 18, 2001.

FIELD OF THE INVENTION

The present invention pertains to relational databases. More particularly, this invention relates to a system and method for materializing records in response to a query.

BACKGROUND OF THE INVENTION

In modem computing environments, databases are usually maintained on a central computer (i.e. a server) that is accessible by a plurality of computer workstations (i.e. clients) connected via a network. The clients have a client database application which is used to access data from a particular database on the server. Each client may be interested in a portion of data in a particular database and these portions of data may overlap for different clients. Accordingly, the server has a database management system (DBMS), such as DB2™ made by IBM™, that is responsible for data storage and concurrency control so that several clients can share the same database without interfering with one another or compromising data integrity. The DBMS is also responsible for recovery features to protect and restore data integrity upon server failures. The DBMS operates using a query database language, such as SQL (Structured Query Language). The client database application may interface with the DBMS using SQL or standard Open Database Connectivity (ODBC) database drivers, such as ODBC 3.0 developed by Microsoft™.

Many databases are implemented as relational databases in which the data contained in the database is organized as though it were formatted into a series of tables. These tables have a series of columns (i.e. fields) which identify the type of information that the table contains and a series of rows (i.e. records) which contain values for each field relating to an entry in the database. One or more of the fields may be used as an index or a key to uniquely identify a record for searching purposes. For example, a table in a database may show employee statistics for a particular company. The fields in the table may be employee name, employee number, number of years of service, salary, available vacation days and the like. The records in the table would contain values for these fields for the employees who work for the company. The employee number field may be used as an index for searching purposes.

A client database application obtains data from a database by requesting a search of the database via a query. The query would ask the DBMS to search certain tables in a particular database for records having fields that satisfy certain criteria. The DBMS then custom builds an access plan for searching the database according to the query and, through the use of a run-time engine, executes a search of the database according to the access plan and generates results of the query in a separate data structure known as a result set or an active set. When the run-time engine of the DBMS locates records which satisfy the query that is made by the client database application and populates the result set, the records are said to be materialized in the result set by the run-time engine. The size of the result set indicates the number of records which satisfy the query. The result set is then communicated to the client database application that submitted the query.

The result set is not formatted to allow individual records to be accessed by the client database application. To remedy this problem, as is well known in the art, a data structure called a database cursor, also known as a cursor, is created to view the records in the result set. When the located records are transferred to the database cursor at the client database application, the records are said to be materialized by the database cursor. Accordingly, the database cursor contains all of the records of the result set and permits the records to be accessed one at a time (also known as scrolling through the result set). The database cursor also maintains a position indicating the current record that the database cursor is pointing at. The database cursor may be used to access and/or modify a record in the result set.

The database cursor is usually created and maintained by the client database application at the time at which the client database application generates a query. The database cursor is built having a structure that is commensurate with the result set that is expected in response to the query. Implementing a database cursor at the client database application permits the application to set data isolation (i.e. data locking) and concurrency levels within the database that the application is interfacing with. Concurrency refers to the ability of the DBMS to permit various clients access to the same database as well as reflecting changes to the data contained in the database to a particular client. Data isolation refers to the ability of the DBMS to inhibit various clients from modifying data in the database. Generally, a high degree of concurrency is correlated with a lower degree of data isolation and vice-versa.

There are various degrees of data locks that are defined in DB2™ such as X-locks, U-locks and S-locks. An X-lock is the most restrictive type of data lock. An X-lock means that a client has an uncommitted change pending on a record in the database. The change could be an update to one of the fields in the record or a deletion of the record. At this time, other clients can not acquire any lock on this record. A U-lock is acquired by clients that may modify a record. During this time, other clients can not acquire a lock on this record. An S-lock is acquired by clients that may not modify a record (i.e., the access is read only).

Unfortunately, database cursors and the method of searching and materializing records in response to a query have certain disadvantages. For instance, if the result set is large then materialization by the run-time engine and the database cursor can be time intensive. This is particularly inefficient in terms of time and resources for the situations in which a user of the client database application scrolls over only a fraction of the records in the result set which is quite common.

In addition, there are also concurrency and data isolation issues since some of the located records may have data locks placed on them by other client database applications. In this case, the DBMS would have to wait until all of the record-level locks are released before sending the result set to the client database application. A user of the client database application may use a UR (i.e. Uncommitted Read) command to avoid this wait and only read (i.e. not update or delete) the records in the result set. However, the user would be exposed to uncommitted (or dirty) data in the result set since some records in the result set may have been updated by other client database applications but yet not committed to the database.

Furthermore, client database applications usually specify timeout criteria which result in the cancellation of a query if the DBMS is taking an excessive amount of time to return a result. If the DBMS has to wait excessively for the locks on records contained in the result to be removed, the client database application may cancel the query before the client database application receives any data which is an inefficient use of system resources. Accordingly, there is a need for an improved method and system for materializing the results of a database query to a client that reduces the materialization and transmission of unwanted search results and improves concurrency issues for server-client networks.

SUMMARY OF THE INVENTION

The present invention provides a computer system comprising a server and a client. The server has a database and a database management system for providing access to the database. The client is operatively coupled to the database management system. The client is adapted to provide a query to the database management system and the database management system is adapted to materialize a number of records in a result set in response to the query. The number of materialized records is selected to reduce inefficient materialization of records from the database in response to the query.

In another aspect, the present invention provides a method for materializing records in a result set in response to a query. The method comprises the steps of:

(a) generating a query from a client for requesting records from a database;

(b) generating a cursor for receiving and accessing the records that satisfy the query;

(c) issuing a command to retrieve the records to a database management system which manages the database, the command specifies a number of records to materialize that is less than or equal to the total number of records that satisfy the query;

(d) searching the database and materializing the specified number of records; and, (e) returning the materialized records to the cursor for processing.

In yet a further aspect, the present invention provides a database system product embodied in a computer readable medium. The database system product comprises instructions for implementing a server having a database and a database management system for providing access to the database. The database system product also comprises instructions for implementing a client that is operatively coupled to the database management system. The client is adapted to provide a query to the database management system and the database management system is adapted to materialize a number of records in a result set in response to the query. The number of materialized records is selected to reduce inefficient materialization of records from the database in response to the query.

In another aspect, the present invention provides a computer program embodied in a computer readable medium. The computer program comprises computer instructions that are adapted to perform a method for materializing records in a result set in response to a query. The method comprises the steps of:

(a) generating a query from a client for requesting records from a database;

(b) generating a cursor for receiving and accessing the records that satisfy the query;

(c) issuing a command to retrieve the records to a database management system that manages the database, the command specifies a number of records to materialize that is less than or equal to the total number of records that satisfy the query;

(d) searching the database and materializing the specified number of records; and, (e) returning the materialized records to the cursor for processing.

DETAILED DESCRIPTION

The present invention pertains to relational databases. More particularly, this invention relates to a system and method for materializing records in response to a query. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
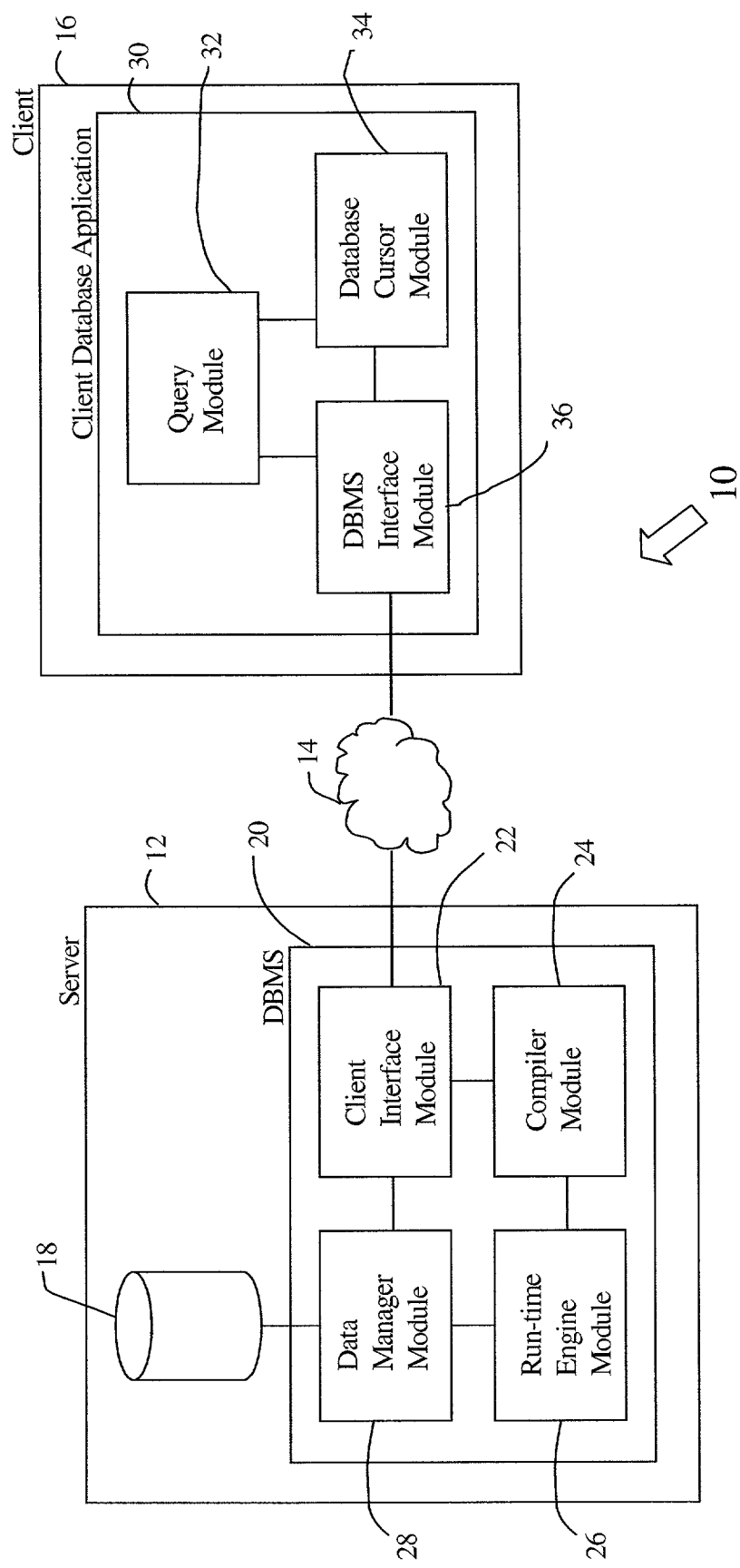
FIG. 1 is a block diagram of system components for the present invention.

The present invention relates to materializing the records found during a search of a relational database in response to a database query. An embodiment of a slow materialization database system 10, in accordance with the present invention, is shown in FIG. 1. The slow materialization database system 10 comprises a database server 12, a network 14 and a client 16. The database server 12 and the client 16 are implemented on a computing platform having an operating system and the associated hardware and software that is necessary to support a database management system of choice. The network 14 may be implemented as a Local Area Network, a Wide Area Network, an Internet connection, a wireless interface, a satellite connection or any other communications means that meets the implementation needs of the present invention to connect the database server 12 with the client 16. In use, there will likely be a plurality of clients that are interfaced by the network 14 to the database server 12 but for simplicity the present invention will be described using one client 16.

The database server 12 and the client 16 generally comprise one or more computer programs and data structures which are all embodied in a retrievable form on a computer-readable medium such as a data storage device. In particular, the database server 12 comprises a database 18 and a database management system (DBMS) 20 having a client interface module 22, a compiler module 24, a run-time engine module 26 and a data manager module 28. For simplicity, the database server 12 is shown having only one database 18 but in general there may be a plurality of databases contained within the database server 12.

The client interface module 22 is adapted to receive requests, via the network 14, from the client 16 to interface with the database 18 contained in the database server 12. In general, these requests will be queries to access data contained in the database 18. The client interface module 22 then parses this query to translate the query into a form that can be understood by the compiler module 24. The translated, parsed query is then sent from the client interface module 22 to the compiler module 24. The client interface module 22 is also adapted to receive data from the database 18, under the guidance of the data manager module 28, and transmit this data to the client 16 via the network 14.

The compiler module 24 is adapted to receive a translated, parsed query from the client interface module 22 and generate an access plan to perform a search on the database 18 to find records that satisfy the query. Since some databases 18 may contain thousands, if not millions of records, the compiler module 24 has an optimization means to generate an access plan to efficiently search the database 18. The compiler module 24 then passes the access plan to the run-time engine module 26.

The run-time engine module 26 is adapted to carry out the access plan received from the compiler module 24 and search the database 18. The data manager module 28 controls access to the database 18 and manages the activities of the DBMS 20 such as file manipulation, data storage and implementing security protocols when more than one client 16 is requesting access to the database 18.

The client 16 comprises a client database application 30 having a query module 32, a database cursor module 34 and a DBMS interface module 36. In general, the client 16 may have several client database applications 30 that interface with the database 18. For simplicity in describing the present invention, only one client database application 30 is shown.

The query module 32 is adapted to generate a query to identify records in the database 18 having fields that satisfy a certain criteria. In the example of the database table given earlier, a criteria may be to search for all employees with more than a certain number of years of service. The query module 32 may preferably use ODBC statements that would be understood by the DBMS 20 to construct the query. The fact that a query has been generated is communicated to the database cursor module 34. In addition, the query is sent to the DBMS interface module 36.

The database cursor module 34 is adapted to generate a database cursor every time a different query is generated by the query module 32. The generated database cursor would have a structure that is commensurate with the records that may be located in response to the query. The database cursor module 34 is also adapted to present the records located in response to the query to a user of the client database application 30 by allowing the user to scroll through the records. The database cursor module 34 is also adapted to allow the user to modify or delete the located records.

The DBMS interface module 36 is adapted to receive a query from the query module 32 and transmit the query, over the network 14, to the client interface module 22 of the DBMS 20. Conversely, the DMBS interface module 36 is also adapted to receive a result set, in response to a query, from the client interface module 22 of the DBMS 20. The DBMS interface module 36 is further adapted to pass result sets to the database cursor module 34.

Figure 2:
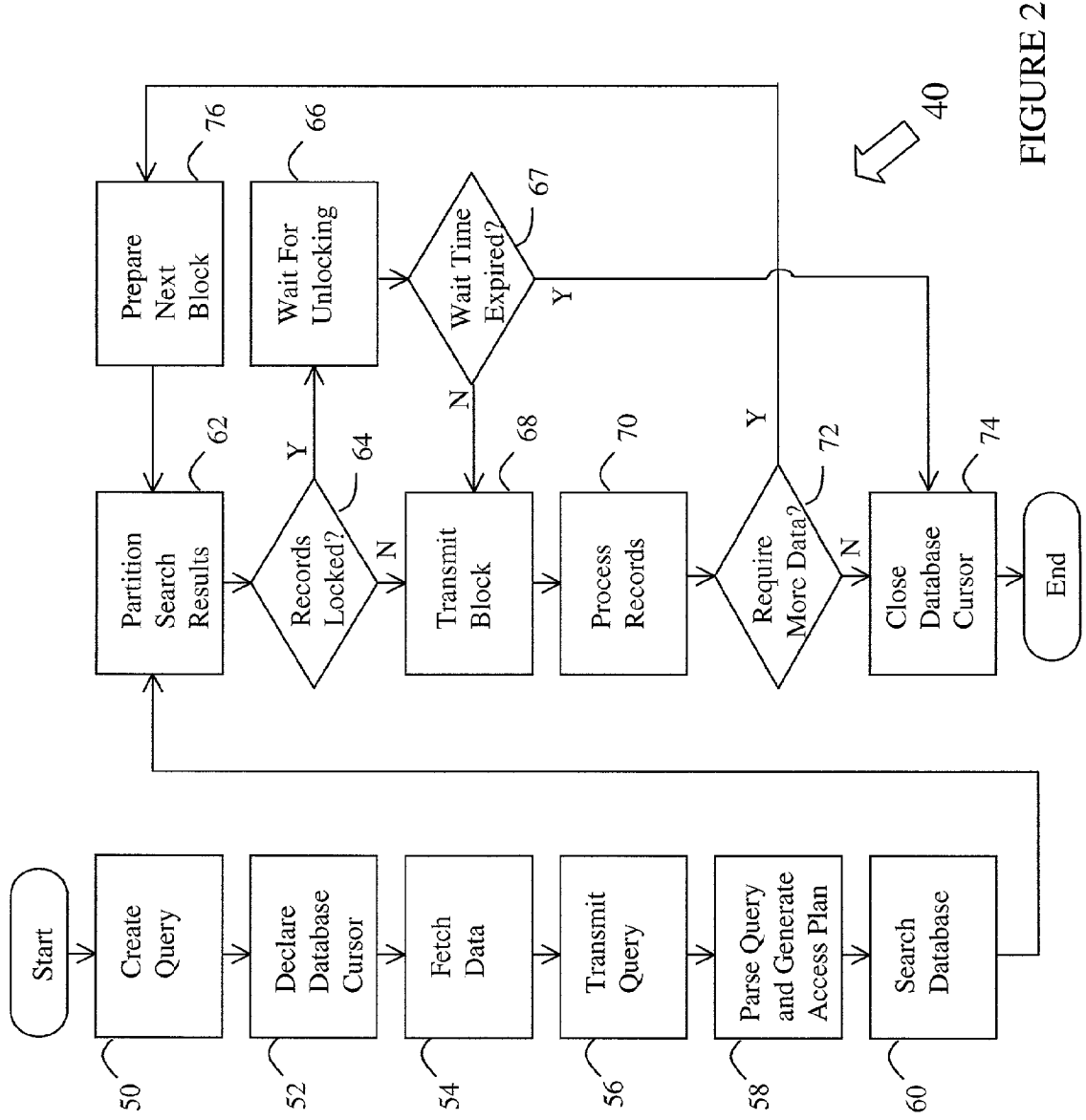
FIG. 2 is a flowchart of a prior art method used to materialize records in response to a query.

In use, prior art materialization of database records resulting from a query using a prior art database system having system components similar to those shown in FIG. 1 would operate according to process 40 shown in FIG. 2. One of the distinctions between the prior art database system and the slow materialization database system 10 of the present invention are the commands that are programmed in the various modules of these two systems. Beginning at step 50, the query module 32 generates a query, notifies the database cursor module 34 that a query has been generated and passes the query to the DBMS interface module 36. At step 52, the database cursor module 34 generates a database cursor by issuing an OPEN command. Next, at step 54, the database cursor module 34 issues a FETCH command to execute the query. The process then moves to step 56 where the DBMS interface module 36 transmits the query, through the network 14, to the client interface module 22 of the DBMS 20. At step 58, the client interface module 22 parses the query and sends the parsed query to the compiler module 24 which generates an access plan to search the database 18 to locate records having fields that satisfy the query.

At step 60, the run-time engine module 26 searches the database 18. As the run-time engine module 26 locates all of the appropriate records, a result set is materialized. Next, at step 62, the result set is conventionally partitioned into blocks of records that are to be sent to the client database application 30. This partitioning is done especially in the case where the number of records in the result set is large. However, before transmitting the blocks to the client database application 30, at step 64, the data manager module 28 must determine whether there are any locked records contained within the current block that is to be transmitted. If there are no locked records, then the current block of records may be transmitted to the DBMS interface module 36 at step 68. However, if there is at least one locked record in the block of records to be transmitted, then at step 66, the data manager module 28 must wait for the locked records to become unlocked. As previously mentioned, the client database application 30 is adapted to wait for a specified period of time for a result set from the DBMS 20. If that "wait time" expires and the locked records have not been unlocked then no data will be returned to the client database application 30 and the process 40 moves to step 74 and ends. However, if the locked records become unlocked before the "wait time" expires, then the block of records is transferred to the DBMS interface module 36 at step 68. Next, at step 70, the database cursor module 34 would receive the block of records from the DBMS interface module 36 and allow a user of the client database application 30 to process the records. After this processing, the database cursor module 34 may require more records at step 72 at which point the database cursor module 34 will notify the DBMS interface module 36 which will transmit this request for more data to the DBMS 20. In this case, the process moves to step 76 at which point the next block of records is prepared for transmission. Otherwise at step 74 the database cursor module 34 would close the database cursor by executing a CLOSE statement.

As previously mentioned in the background, this prior art database materialization method is inefficient for two reasons. Firstly, the run-time engine module 26 locates and materializes all of the records that satisfy the query (i.e. step 60) even if all of the records are not inspected (i.e. step 70). Secondly, the data manager module 28 must wait for all records in a block of data to be unlocked (i.e. steps 64 and 66) before transmitting the block of data to the client database application 30. The chances of having a block of data with locked records increases when the block of data has many records. This wait period is wasteful since the client 16 may not view the locked records in the block and secondly, if the wait period is excessive, the client database application 30 will cancel the query.

In accordance with the present invention, the database cursor module 34 and the run-time engine module 26 have been augmented such that a smaller portion of located records are materialized by the run-time engine module 26. Furthermore, the searching and block fetch operation described in FIG. 2 at steps 60 and 62 has been augmented to minimize the amount of located records that are not viewed by the client 16. Accordingly, the slow materialization database system 10 delays materializing records in the result set until the first time that the records are fetched. If these records are locked, then the slow materialization database system 10 must still wait for the records to be unlocked. However, since a smaller amount of records are being materialized, then the probability of having to wait for locked records should be reduced. The slow materialization database system 10 is adapted to be as conservative as possible to reduce any concurrency issues between various clients 16 accessing the same database. Therefore, the run-time engine module 26 is preferably adapted to retrieve a minimal number of records that satisfy the query. This is compliant with the ODBC 3.0 standard since the record count of the result set is defined as the number of records fetched so far. The minimal number of records is set by the database cursor module 34 as described further below.

If the result set is large for a particular query, and the client 16 only wishes to search a small subset of the result set, then the slow materialization database system 10 represents an increase in time savings since the run-time engine module 26 will not materialize and return an excessive number of located records. The run-time engine module 26 is adapted to only materialize the records that are requested by the database cursor module 34 via a FETCH statement. Accordingly, the FETCH statement is augmented to specify a certain number of records to materialize rather than materializing all of the records that satisfy the query as would be done in the prior art process 40. If the client 16 does not find the desired records in the result set returned to the client database application 30, then the run-time engine module 26 would be instructed to materialize more records. This process may repeat itself until the client 16 has processed all records of interest in the result set.

In addition, materializing a smaller number of records in the result set will reduce the probability that the result set materialized thus far has records that are locked. The slow materialization database system 10 optimistically waits only for locked records that have been specifically requested by an issued FETCH statement and not for all records that could be in a partitioned block of the result set as is conventionally done by the prior art process 40 when a cursor OPEN statement or the first FETCH statement is issued. Therefore, there is less of a concurrency issue with the slow materialization database system 10. Accordingly, there would also be a lower probability that the client 16 would be exposed to uncommitted data in the result set. In addition, query request cancellations by the client database application should be reduced since the data manager module 28 will not likely encounter locked records as often as in the prior art process 40.

In accordance with the present invention, the database cursor module 34 is adapted to preferably generate a Sensitive Static Scroll (SSS) database cursor that adheres to the CLI standard (i.e. the Cell Level Interface standard which is part of the SQL 92 standard). The CLI standard is generally equivalent to the ODBC 3.0 standard for database cursors. The SSS database cursor has the properties of being sensitive, static and scrollable. A database cursor that is sensitive may be used to UPDATE or DELETE a record in the result set. Furthermore, a database cursor that is sensitive also reflects changes to the materialized records in the result set which result from activity by other clients using the database 18. This is done in real-time as these changes are committed to the database 18 by other client database applications 30.

A database cursor that is static has a result set that is fixed once the last record to satisfy the query has been found and materialized by the run-time engine module 26. No new records will ever appear in the result set. Accordingly, the number and names of the fields as well as the order of the fields of the records in the result set are fixed.

A database cursor that is scrollable means that the database cursor may be positioned at a record in the result set by specifying a value for an ORIENTATION attribute. Values which may be used, as defined by the CLI standard and the ODBC 3.0 standard, include NEXT, PRIOR, FIRST, LAST, BEFORE, AFTER, ABSOLUTE <offset>, RELATIVE <offset> and BOOKMARK <bookmark value>. This is in contrast to a normal database cursor which may only scroll by fetching the next record (i.e. scrolling forward) using the command NEXT. The SSS database cursor also preferably has the data isolation property of cursor stability which, according to DB2™, means that other client database applications may not modify the record that the SSS database cursor is currently positioned at. This increases the concurrency of the slow materialization database system 10 since only single records are locked rather than blocks of records.

Figure 3:
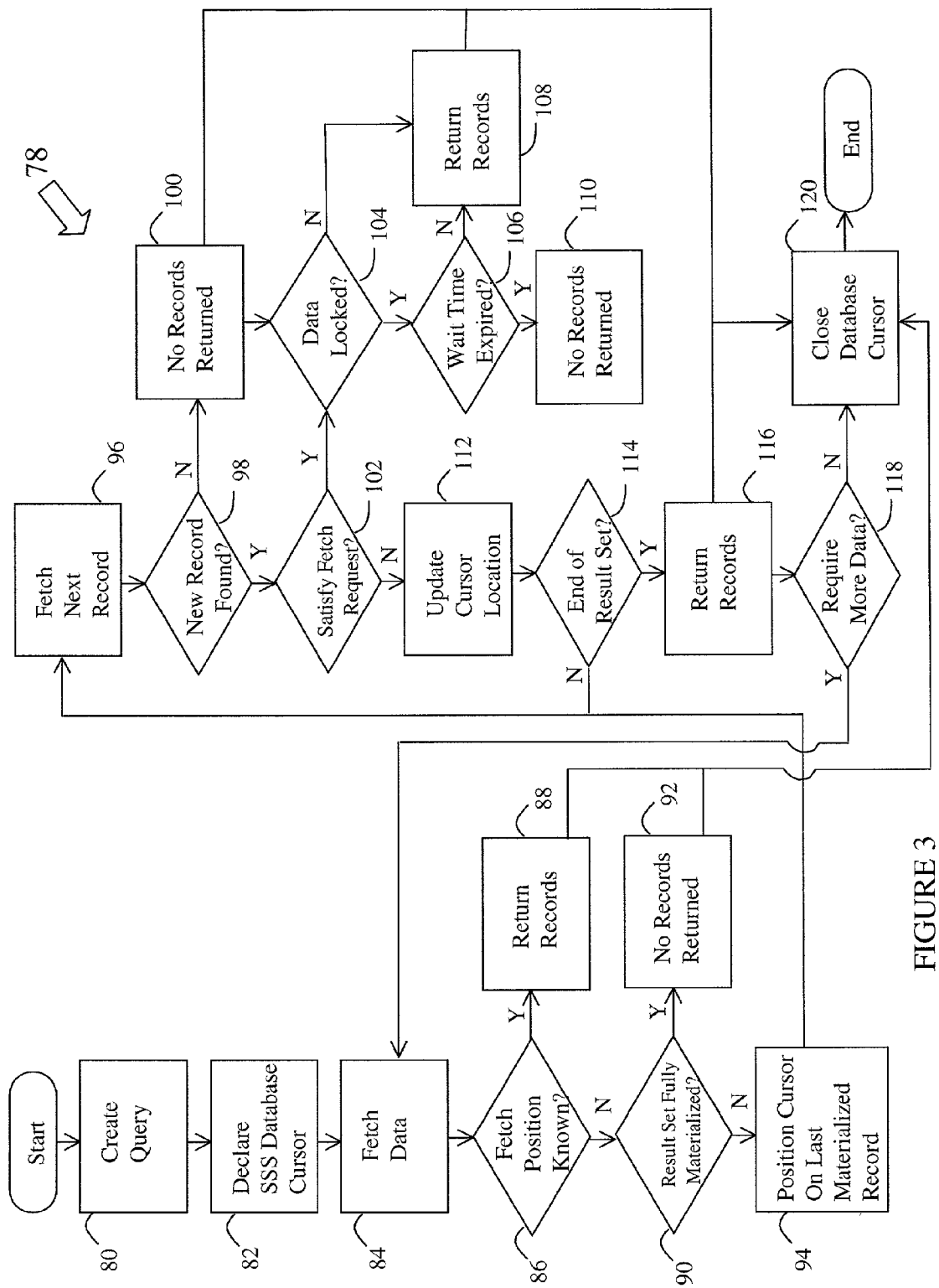
FIG. 3 is a flowchart of an embodiment for slow materialization of records in response to a database query.

Referring now to FIG. 3, shown therein is a flowchart of the slow materialization process 78 of the present invention. The slow materialization process 78 begins at step 80 where the query module 32 generates a query, transmits the query to the DBMS interface module 36 and notifies the database cursor module 34 that a query has been generated. The database cursor module 34 then generates a SSS database cursor at step 82. The database cursor module 34 then issues a FETCH command at step 84 to request one or more records in the result set that will be materialized by the run-time engine module 26. The number of records that will be materialized is determined by the ORIENTATION attribute of the FETCH command. If the ORIENTATION attribute is set to AFTER then all of the records in the result set will be materialized by the run-time engine module 26 in which case there would be no advantage in the slow materialization database system 10. At the other extreme, the ORIENTATION attribute may be set to NEXT in which case only one record would be materialized at a time by the run-time engine module 26. While this would decrease database system efficiency due to materializing and transmitting only one record at a time, this would minimize concurrency issues. The ORIENTATION attribute may also be set to ABSOLUTE <offset> or RELATIVE <offset> to instruct the run-time engine module 26 to materialize a number of records in the result set, the number of which is equal to the value specified by <offset>. For the remainder of the description of the present invention, it is assumed that a plurality of records are being FETCHed. As one skilled in the art will recognize, a single record may be FETCHed, but for the purposes of illustration we refer to a plurality of records being fetched. The DBMS interface module 36 would then transmit the query to the client interface module 22 of the DBMS 20 which would parse and transmit the parsed query to the compiler module 24.

The number of records to be materialized is generated according to the needs of the user who is using the client database application 30. For instance, the user may generate a query and the ORIENTATION attribute may first be specified to materialize enough records to fill a computer screen that the user is using to interface with the client database application 30. Subsequent values for the ORIENTATION attribute would then be generated according to the fashion in which the user scrolls through these first materialized records. For instance, the user may hit the "Page Down" key in which case another set of records, the number of which depends on computer screen size and character font size, may be materialized and placed on the computer screen. Alternatively, the user may be at the last record on the computer screen and hit the "Arrow Down" key in which case the next record will be materialized and placed on the computer screen. The user may alternatively hit the "Control" and "End" keys simultaneously in which case all of the records in the result set would be materialized and the cursor would be positioned on the last record in the result set. In practice, users generally scroll over (i.e. "fetch") only a few hundred records in a result set by using the "Page Down" and "Arrow Down" keys as described above whereas the result set, if fully materialized, may actually contain hundreds of thousands of records. Thus, slow materialization will result in time savings as well as a savings in memory utilization since only a small subset of the records in the result set is materialized (i.e. a few hundred records versus hundreds of thousands of records) versus a prior art database system that would materialize all of the records in the result set. In addition, as previously mentioned, materializing only a few hundred records versus hundreds of thousands of records should reduce concurrency issues when many clients are trying to access the same database.

Although the above example refers to keys on a traditional computer keyboard, one skilled in the art will recognize that any combination of keystrokes may be utilized to provide the actions mentioned above. The above keystrokes serve only a s examples, Furthermore, any other suitable computing device may be used such as a laptop, a wireless handheld palmtop and the like.

At step 86, after an access plan has been generated by the compiler module 24, the run-time manager module 28 determines whether the ORIENTATION specified in the FETCH statement is for records that have been previously materialized. It is possible that the client 16 may be requesting records that have been previously materialized in which case, the DBMS 20 would provide the requested records again to the client 16 at step 88 and then move to step 118 where a request for more data may be made. If the requested records have not been previously materialized, at step 90 it must be determined whether the result set is fully materialized. If the result set is fully materialized and the ORIENTATION position specifies a position outside of the result set, the process moves to step 92 where no records are returned, the message NO DATA FOUND is sent to the DBMS interface module 36 and the size and membership of the result set is now fixed for the lifetime of the SSS database cursor. The SSS database cursor is positioned AFTER the last record in the result set. The process 78 moves to step 118 where more data may be required.

If the decision at step 90 is negative then the ORIENTATION attribute is specifying a record that has not already been materialized and the result set is not fully materialized. The run-time engine module 26 must begin materializing new records to the result set starting from the last materialized record. Accordingly, at step 94, the SSS database cursor is positioned on the last record materialized so far. At step 96, the next record is FETCHed (i.e. materialized). If the next record exists then this would be the first time that it is materialized. At step 98, if the FETCH operation fails to find a record, then the result set has been fully materialized. The process 78 moves to step 100 where the message NO DATA FOUND is sent to the DBMS interface module 36, the SSS database cursor is positioned AFTER the last record in the result set and the process 78 moves to step 118. However, If a new record is found then the process 78 moves to step 102 where the data manager module 28 determines whether the FETCH request is satisfied (i.e. all of the records specified by the ORIENTATION attribute of the FETCH request have been materialized). If the FETCH request is satisfied, then the process 78 moves to step 104 where the data manager module 28 may have to wait if one or more of the newly materialized records are locked. If none of the newly materialized records are locked, or after all of the newly materialized records that were locked have been unlocked, the process 78 moves to step 108 where the newly materialized records are sent to the DBMS interface module 36 via the client interface module 22 and the network 14. Otherwise, the process 78 moves to step 106 to determine whether the locked records are unlocked before the client database application 30 stops waiting for returned records. If the records are unlocked and the client database application 30 is still waiting for data, then the process 78 moves to step 108 where the records are returned to the DBMS interface module 36. Conversely, if the records are not unlocked in time, the process 78 moves to step 110 where no records are returned to the DBMS interface module 36, the message TIME EXPIRED is sent to the DBMS interface module 36, the SSS database cursor is positioned AFTER the last record in the result set and the process 78 moves to step 118.

If the FETCH request at step 102 is not satisfied then the process 78 moves to step 112 where the position of an index variable is updated to point to the last record that was materialized. The process 78 then moves to step 114 where the data manager module 28 determines whether the result set has been fully materialized. If this is true, the process moves to step 116 where any records that have been newly materialized are returned to the DBMS interface module 36 (note: waiting may have to be done at this time as shown in steps 104 and 106). The SSS database cursor is then positioned AFTER the last record materialized in the result set. Otherwise the process 78 moves to step 96 to repeat the process steps until the ORIENTATION attribute of the FETCH request is satisfied or the result set has been filly materialized. In either case, once the SSS database cursor has finished processing the records in the FETCH request, the next step in the process 78 would be for the database cursor module 34 to determine if a new FETCH request will require more data at step 118. If more data is required at step 118, then the process moves to step 84 where more data is FETCHed. Otherwise, the process 78 moves to step 120 where the database cursor module 34 would close the SSS database cursor by executing a CLOSE statement at step 120.

Although the invention has been described in the context of a DB2™ relational database product, it should be understood by those skilled in the art, that the underlying principles of the invention as described above apply to other types of database systems. In addition, the present invention may be adapted to operate with a DBMS that does not support SQL. Furthermore, although the present invention was described with the server 12 on one computing platform, the invention is also applicable to distributed database systems in which databases are located on several computing platforms.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for materializing records in a result set in response to a query, said method comprising the steps of:
   (a) generating a query from a client for requesting records from a database;
   (b) generating a cursor for receiving and accessing said records that satisfy said query;
   (c) issuing a command to retrieve said records to a database management system, said database management system managing said database, said command specifying a number of records to materialize that is less than or equal to the total number of records that satisfy said query;
   (d) searching said database and materializing said specified number of records; and,
   (e) returning said materialized records to said cursor for processing.

2. The method of claim 1, wherein said number of records to materialize is selected according to the fashion in which said client scrolls through said materialized records.

3. The method of claim 1, wherein said cursor generating step (b) further includes the step of (b1) specifying that said database cursor is sensitive, static, scrollable and provides cursor stability for data isolation.

4. A computer program embodied in a computer readable medium, said computer program comprising computer instructions adapted to perform a method for materializing records in a result set in response to a query, said method comprising the steps of:
   generating a query from a client for requesting records from a database;
   generating a cursor for receiving and accessing said records that satisfy said query;
   issuing a command to retrieve said records to a database management system, said database management system managing said database, said command specifying a number of records to materialize that is less than or equal to the total number of records that satisfy said query;
   searching said database and materializing said specified number of records; and, returning said materialized records to said cursor for processing.

5. The computer program of claim 4, wherein said number of records to materialize is selected according to the fashion in which said client scrolls through said materialized records.

6. The computer program of claim 5, wherein generating said cursor includes specifying that said cursor is sensitive, static, scrollable and provides cursor stability for data isolation.

* * * * *

UNITED STATES PATENT AND TRADEMARK OFFICE
CERTIFICATE OF CORRECTION

| | |
|---|---|
| PATENT NO. | : 7,043,469 B2 |
| APPLICATION NO. | : 10/183749 |
| DATED | : May 9, 2006 |
| INVENTOR(S) | : Goralwalla et al. |

It is certified that error appears in the above-identified patent and that said Letters Patent is hereby corrected as shown below:

Title Page

Item (75), Inventors, David C. Sharpe's Address, delete "(CA)" and replace with --, CA (US)--.

Column 1

Line 20, delete "modem" and replace with --modern--.

Column 10

Line 38, delete "filly" and replace with --fully--.

Signed and Sealed this

Fifth Day of September, 2006

JON W. DUDAS
*Director of the United States Patent and Trademark Office*